United States Patent
Musk et al.

(10) Patent No.: US 9,766,406 B2
(45) Date of Patent: Sep. 19, 2017

(54) OPTICAL SUBASSEMBLY, OPTICAL SYSTEM AND METHOD

(71) Applicant: EFFECT PHOTONICS B.V., Eindhoven (NL)

(72) Inventors: Robert William Musk, Devon (GB); Tim Koene, Eindhoven (NL)

(73) Assignee: EFFECT PHOTONICS B.V., Eindhoven (NL)

( * ) Notice: Subject to any disclaimer, the term of this patent is extended or adjusted under 35 U.S.C. 154(b) by 46 days.

(21) Appl. No.: 14/907,065

(22) PCT Filed: Jul. 24, 2014

(86) PCT No.: PCT/NL2014/050509
§ 371 (c)(1),
(2) Date: Jan. 22, 2016

(87) PCT Pub. No.: WO2015/012693
PCT Pub. Date: Jan. 29, 2015

(65) Prior Publication Data
US 2016/0147020 A1    May 26, 2016

(30) Foreign Application Priority Data

Jul. 24, 2013 (EP) ..................................... 13177762

(51) Int. Cl.
*G02B 6/30*    (2006.01)
*G02B 6/42*    (2006.01)

(52) U.S. Cl.
CPC ............... *G02B 6/305* (2013.01); *G02B 6/30* (2013.01); *G02B 6/4212* (2013.01); *G02B 6/4253* (2013.01)

(58) Field of Classification Search
CPC ........ G02B 6/305; G02B 6/30; G02B 6/4212; G02B 6/4253
See application file for complete search history.

(56) References Cited

U.S. PATENT DOCUMENTS 5,444,804 A * 8/1995 Yui ........................ G02B 6/30
385/49
7,723,687 B2 * 5/2010 Nagarkar ................ G01T 1/202
250/361 R
(Continued)

FOREIGN PATENT DOCUMENTS

EP    0 636 909 A1    2/1995
JP    07294769 A *    11/1995
(Continued)

OTHER PUBLICATIONS

International Search Report, dated Sep. 24, 2014, from corresponding PCT application.

*Primary Examiner* — Peter Radkowski

(74) *Attorney, Agent, or Firm* — Young & Thompson

(57) ABSTRACT

An optical subassembly (1) includes a photonic integrated circuit (2), an external optical system (4) and an optical interface (6) that is arranged between the PIC and the external optical system. The optical subassembly includes a third material (7) and a fourth material (8). The third material (7) at least partially fills the optical interface between the PIC and the external optical system in order to minimize contamination of any kind. The fourth material (8) being in contact at least with the third material for sealing at least the third material from ambient moisture. In this way a low-cost near-hermetic environmental protection barrier (7, 8) may be provided. An optical system (14) including the optical subassembly and a method of fabricating such an optical subassembly are also described.

19 Claims, 3 Drawing Sheets

(56) References Cited

U.S. PATENT DOCUMENTS

2002/0037143 A1* 3/2002 Kuhara .............. G02B 6/29361
385/94
2009/0008561 A1* 1/2009 Nagarkar ................ G01T 1/202
250/361 R

FOREIGN PATENT DOCUMENTS

| JP | H07 294769 A | 11/1995 |
| JP | 2005 250115 A | 9/2005 |
| JP | 2005250115 A * | 9/2005 |

* cited by examiner

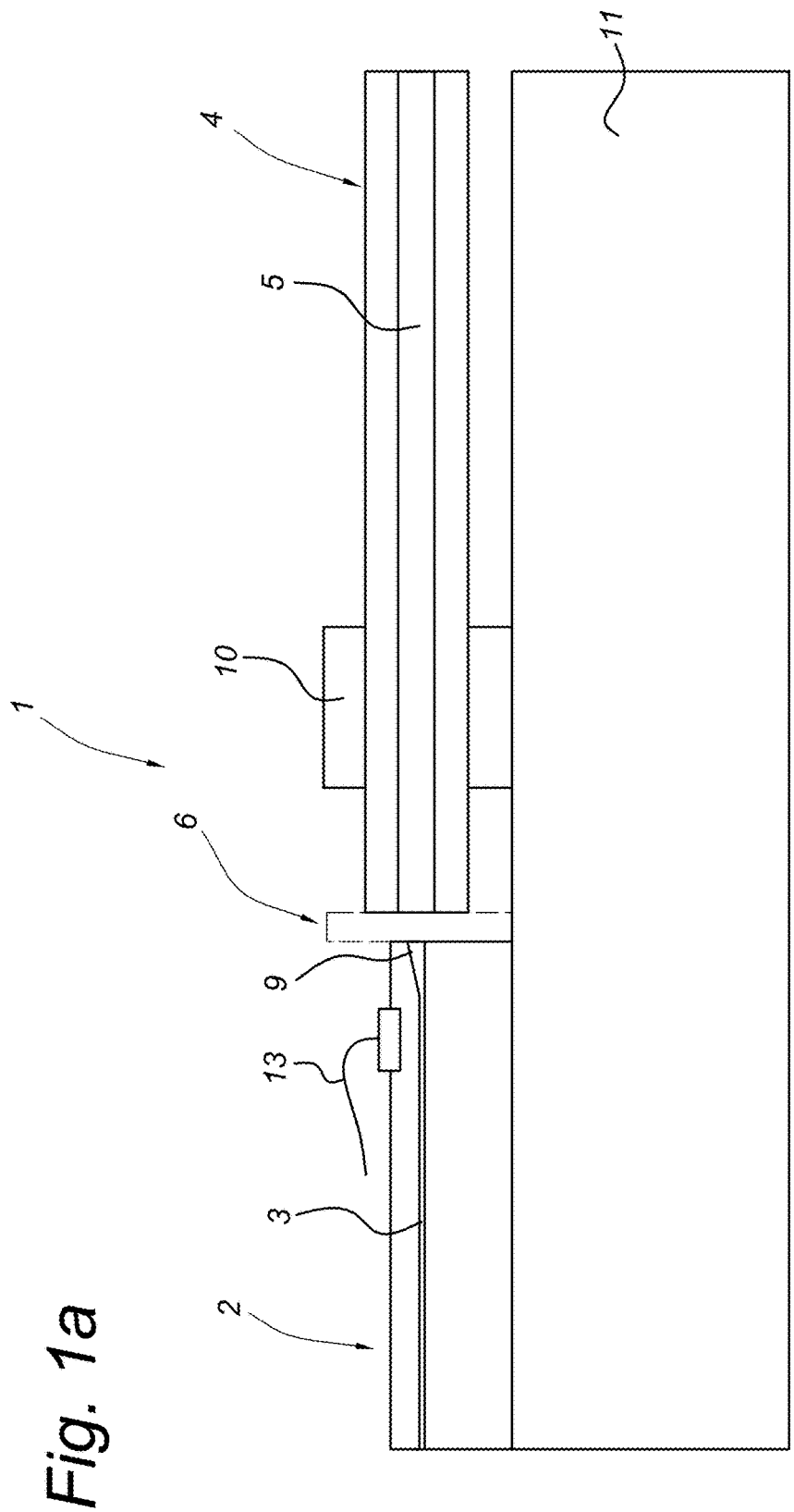

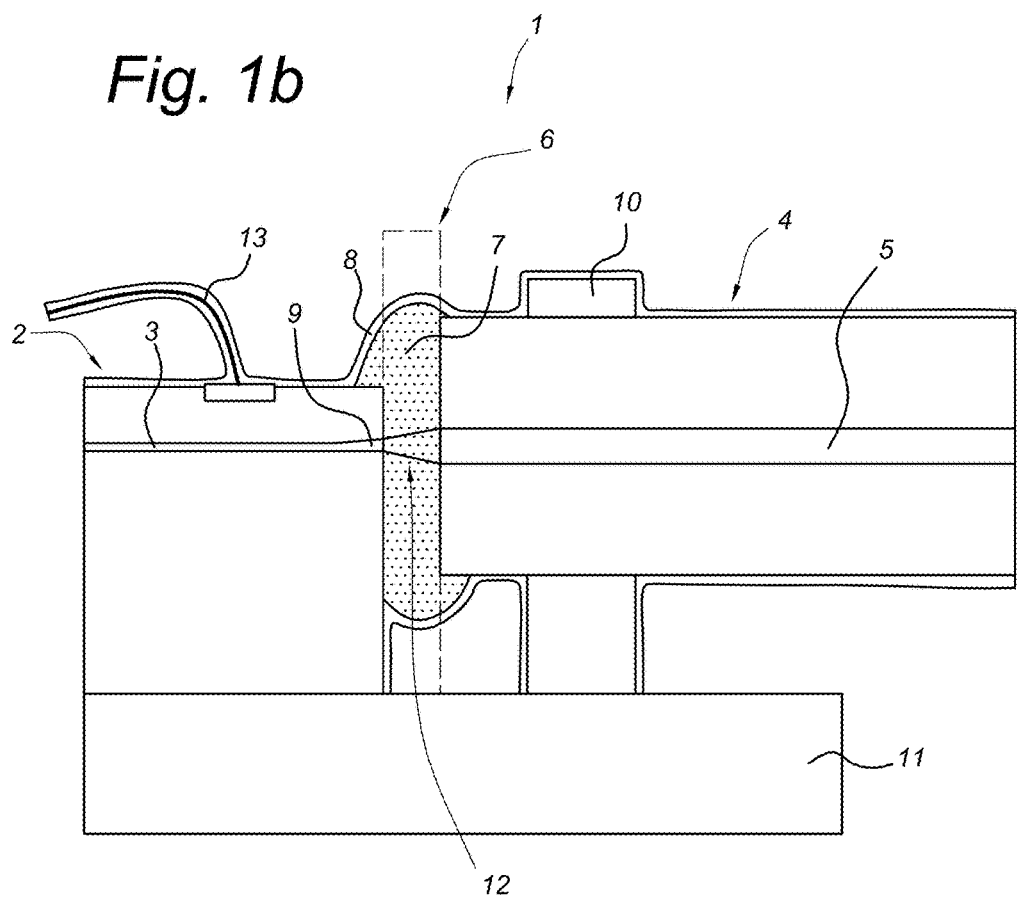

OPTICAL SUBASSEMBLY, OPTICAL SYSTEM AND METHOD

FIELD OF THE INVENTION

The invention relates to an optical subassembly comprising a photonic integrated circuit (PIC) having a first optical waveguide, an external optical system having a second optical waveguide, and an optical interface that is arranged between the PIC and the external optical system for optical communication between the first optical waveguide and the second optical waveguide. The optical subassembly further comprises a near-hermetic environmental protection barrier for minimizing contamination of any nature in an optical path of the optical interface. The invention also relates to an optical system comprising an optical subassembly according to the invention and a method of fabricating an optical subassembly according to the invention.

BACKGROUND OF THE INVENTION

As the complexity of photonic integrated circuits (PICs) increases, the physical size and the number of electrical connections, among others, also increase significantly. Unlike electrical integrated circuits, PICs comprising at least one optical waveguide require one or more optical interfaces in order to get photons in or out of the PIC, i.e. to enable optical communication between said at least one optical waveguide and an external optical system such as an optical fiber.

Regarding packaging of an optical subassembly that comprises a PIC and an external optical system, the optical interface between the PIC and the external optical system present several constraints. A first exemplary constraint is the use of a lens or an optical coupling system to maximise the coupling efficiency between the PIC and the external optical system.

A second exemplary constraint is the use of antireflection coatings on all optical surfaces at the optical interface in order to minimise reflections of optical signals back into at least one of the PIC and the external optical system. In this way, coupling efficiency is also enhanced.

A third exemplary constraint is that it is absolutely essential to avoid any contamination in an optical path between the PIC and the optical fiber or external optical system. Not only does this apply to particulate contamination, but most importantly to the avoidance of condensation of water on optical surfaces at the optical interface due to external environmental conditions which can change the optical performance of the optical interface or possibly form a site for corrosion.

In order to provide absolute environmental protection to the optical subassembly and associated optical interface between the PIC and the external optical system taking into account the constraints mentioned above, conventional packaging utilises a hermetic package. In this respect, it is common practice to provide an anti-reflection coated window in the package or a hermetically sealed fiber connected to the package. Implementing more than one hermetically sealed fiber into the package can present both technical and manufacturing problems because normally the fibers need to be mechanically manipulated within the package for the purposes of alignment and fixing.

In either case, i.e. application of a hermetic window or a hermetically sealed fiber, the cost of the hermetic package and associated manufacturing processes and costs will dominate the total cost of the packaged optical subassembly. A requirement to support high numbers of electrical connections as is normal for PICs also adds to the complexity and therefore to the cost of the hermetic package.

SUMMARY OF THE INVENTION

It is an object of the invention to provide an optical subassembly having a near-hermetic environmental protection barrier that pre-empts or at least reduces at least one of the disadvantages mentioned above in relation to conventionally used hermetic packages. It is also an object of the invention to provide an optical system comprising an optical subassembly according to this invention. Furthermore, it is an object of the invention to provide a method of fabricating an optical subassembly according to this invention.

Aspects of this invention are set out in the accompanying independent and dependent claims. Combinations of features from the dependent claims may be combined with features of the independent claims as appropriate and not merely as explicitly set out in the claims.

According to a first aspect of this invention, there is provided an optical subassembly comprising a photonic integrated circuit (PIC) having a first optical waveguide, an external optical system having a second optical waveguide, and an optical interface that is arranged between the PIC and the external optical system for optical communication between the first optical waveguide and the second optical waveguide. The optical subassembly also comprises a third material at least partially filling the optical interface while covering at least the first optical waveguide and the second optical waveguide for establishing a protected optical path between the PIC and the external optical system. The optical subassembly further comprises a fourth material being in contact with at least the third material for sealing at least the third material.

In an embodiment of the optical subassembly according to the invention, the third material is a silicone.

In an embodiment of the optical subassembly according to the invention, the PIC comprises a spot size converter (SSC) that is arranged between the first optical waveguide and the second optical waveguide.

In an embodiment of the optical subassembly according to the invention, the fourth material comprises a conformal moisture protection barrier.

In an embodiment of the optical subassembly according to the invention, the conformal moisture protection barrier comprises an acrylic resin (AR).

In an embodiment of the optical subassembly according to the invention, the conformal moisture protection barrier comprises an epoxy resin (ER).

In an embodiment of the optical subassembly according to the invention, the conformal moisture protection barrier comprises a polyurethane resin (UR).

In an embodiment of the optical subassembly according to the invention, the conformal moisture protection barrier comprises a silicone resin (SR).

In an embodiment of the optical subassembly according to the invention, the conformal moisture protection barrier comprises a vacuum deposited poly(para-xylylene) (XY) layer.

According to a second aspect of this invention, there is provided an optical system comprising an optical subassembly according to this invention.

According to a third aspect of this invention, there is provided a method of fabricating an optical subassembly comprising the steps of providing a photonic integrated circuit having a first optical waveguide, providing an external optical system having a second optical waveguide, arranging the PIC and the external optical system with respect to each other to establish an optical interface for optical communication between the first optical waveguide and the second optical waveguide, applying a third material to at least partially fill the optical interface wherein the third material at least covers the first optical waveguide and the second optical waveguide for establishing a protected optical path between the PIC and the external optical system, and applying a fourth material to be in contact with at least the third material for sealing at least the third material.

In an embodiment of the method according to the invention, in the step of providing the third material, the third material is a silicone.

In an embodiment of the method according to the invention, in the step of applying the fourth material, the fourth material is a conformal moisture protection barrier.

In an embodiment of the method according to the invention, the conformal moisture protection barrier comprises an acrylic resin (AR) that is spin-coated and subsequently cured at elevated temperatures for forming a thin conformal film.

In an embodiment of the method according to the invention, the conformal moisture protection barrier comprises an epoxy resin (ER).

In an embodiment of the method according to the invention, the conformal moisture protection barrier comprises a polyurethane resin (UR).

In an embodiment of the method according to the invention, the conformal moisture protection barrier comprises a silicone resin (SR).

In an embodiment of the method according to the invention, the conformal moisture protection barrier comprises a poly(para-xylylene) (XY) layer that is vacuum deposited using chemical vapour deposition (CVD).

BRIEF DESCRIPTION OF THE DRAWINGS

Embodiments of the present invention will be described hereinafter, by way of example only, with reference to the accompanying drawings which are schematic in nature and therefore not necessarily drawn to scale. Furthermore, like reference signs in the drawings relate to like elements. On the attached drawing sheets, FIG. 1a shows a schematic cross-section of an optical subassembly having an unprotected optical interface;

FIG. 1b shows a schematic cross-section of an exemplary embodiment of an optical subassembly according to the invention.

DETAILED DESCRIPTION

Figure 2:
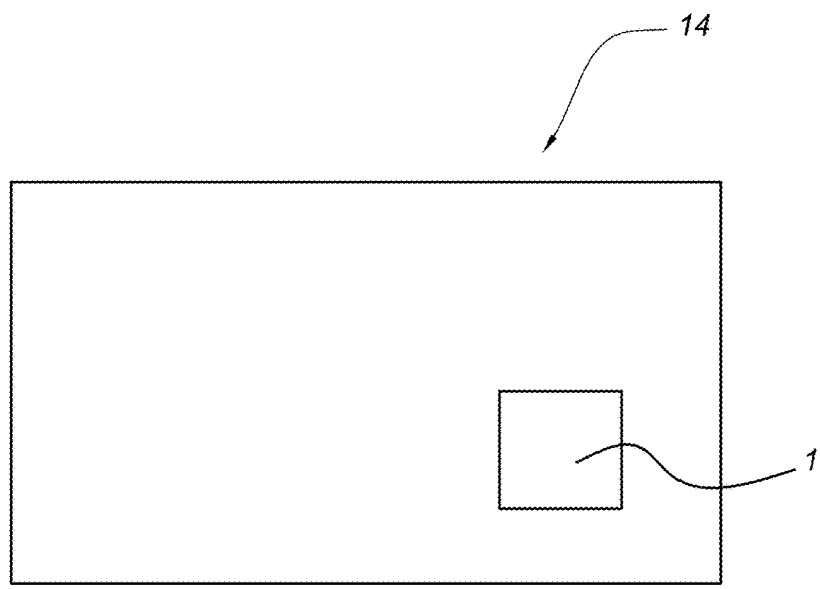
FIG. 2 shows a schematic layout of an exemplary embodiment of an optical system according to the invention comprising an optical subassembly according to the invention.

Embodiments of the present invention are described in the following with reference to the accompanying drawings.

In order to reduce packaging costs, one solution, which is particularly suited for optical subassemblies comprising a PIC and a external optical system, is to adopt a non-hermetic packaging solution that obviates the use of a costly hermetic package and therefore does not bring about the associated significant tooling costs and lead time delays.

FIG. 1a shows a schematic cross-section of an optical subassembly 1 comprising a PIC 2 having a first optical waveguide 3 and an external optical system 4 having a second optical waveguide 5. The optical subassembly 1 further comprises an optical interface 6 that is arranged between the PIC 2 and the external optical system 4 for optical communication between the first optical waveguide 3 and the second optical waveguide 5.

FIG. 1a shows that the optical interface 6 is unprotected and therefore is vulnerable to contamination of any kind. As a result, the optical performance of the optical subassembly 1 shown in FIG. 1a may significantly be compromised.

It is known that the use of silicones or suitable index match materials, i.e. materials having a refractive index that is configurable to match the refractive index of another material, in the optical interface 6 provides protection against particulate contamination.

Suitable silicones are very effective in protecting optical surfaces of an optical interface 6 from moisture and humidity, particularly at elevated temperatures. The optical surfaces are not wetted by water, as can be seen with silicone gaskets and common silicone bathroom caulks. However, despite this hydrophobicity, silicones are permeable to atmospheric water vapour. In fact, they are permeable to most gaseous molecules and their permeability to such small molecules as water is by far the highest of any of the polymeric materials used as conformal coatings.

Nevertheless, silicones provide excellent moisture resistance for circuitry because they adhere sufficiently well to the optical surfaces of an optical interface 6 to eliminate any place for liquid water to condense. The flexibility of silicone and the stability of its other physical properties over a broad temperature range work in favour of maintaining adhesion under severe temperature cycling conditions. Moreover, silicones, though water permeable, have low equilibrium moisture content. Thus, during conditions of elevated temperature and humidity, molecular moisture may permeate the conformal coating. However, during conditions of lower ambient temperature, the molecular moisture escapes, and the optical surfaces of the optical interface 6 are still dry.

Moreover, the refractive index of silicone can be tailored or specified to match the requirements of the optical interface 6. As the refractive index of silicone is substantially higher than that of air, the complexity and cost of the anti-reflection coating in the optical interface 6 is at least reduced.

With the use of spot size converters (SSCs) 9 at the optical interface 6 to achieve a large spot size first optical waveguide 3 of the PIC 2, the need for intermediate optical lenses is at least reduced and in some cases even eliminated. Particularly in the case of an optical fiber as external optical system 4, the fiber 4 can be placed in very close proximity to the first optical waveguide 3 of the PIC 2. Furthermore, the optical interface 6 between the first optical waveguide 3 of the PIC 2 and the second optical waveguide 5 of the fiber 4 can be filled with a silicone or a suitable index match material 7 as is shown in FIG. 1b.

However, whilst the application of a silicone or index match material 7 at the optical interface 6 can provide a known good level of environmental protection, the present invention aims to enhance the level of environmental protection and to provide improved mechanical protection to the optical interface 6 and other electrical elements and interconnects 13 of the PIC 2 and associated circuitry.

FIG. 1b shows a schematic cross-section of an exemplary embodiment of an optical subassembly 1 according to the invention. A third material 7, for example a cured liquid-phase silicone, partially fills the optical interface 6 while covering the optical surface of the SCC 9 of the first optical waveguide 3 and the optical surface of the second optical waveguide 5. In this way, an optical path 12 that is protected from any particulate contamination of any kind is established between the PIC 2 and the optical fiber 4.

In an exemplary embodiment of the optical subassembly 1 according to the invention, the third material 7 has a refractive index that may be equal to the refractive index of any one of the material of the first optical waveguide 3 and the material of the second optical waveguide 5. Typically the refractive index of the material of the first optical waveguide 3 of the PIC 2 is quite different from the refractive index of the material of the second optical waveguide 5 of the optical fiber 4. Normally, the refractive index of the third material 7 is matched as good as possible to the refractive index of the material of the second optical waveguide 5. In this case, the use of an anti-reflection coating on the optical surface of the second optical waveguide 5 can be avoided whereas the optical surface of the first optical waveguide 3 is provided with an anti-reflection coating to reduce reflections at the optical boundary between the material of the first optical waveguide 3 and the third material 7. As a result, the use of anti-reflection coatings on optical surfaces at the optical interface 6 of the subassembly 1 according to the invention can at least be reduced.

As shown in FIG. 1b, the optical subassembly 1 also comprises a fourth material 8 being in contact with at least the third material 7 for sealing at least the third material 7, in particular from ambient moisture. The skilled person will appreciate that the fourth material 8 may seal the entire optical subassembly 1. The fourth material 8 being a conformal moisture protection barrier that may be applied using a vacuum deposition process or otherwise.

The conformal moisture protection barrier 8 shown in FIG. 1b may be an acrylic resin (AR). Acrylic resins are preformed acrylic resins that are dissolved in a solvent. After applying an AR to at least the optical interface 6 of the optical subassembly 1, the AR is cured at elevated temperatures for driving off the solvent and leaving behind a thin film at least around the optical interface 6 of the optical subassembly 1.

The conformal moisture protection barrier 8 shown in FIG. 1b may also be an epoxy resin (ER). Epoxy resins are usually available as two part resins that start to cure upon mixing the two parts. An ER is suitable for coating the entire optical subassembly 1.

Furthermore, the conformal moisture protection barrier 8 shown in FIG. 1b may be a polyurethane resin (UR). Polyurethane resins are either single or two-component compounds providing good humidity and chemical resistance with a high sustained dielectric property.

The conformal moisture protection barrier 8 shown in FIG. 1b may also be a silicone resin (SR). Silicone resins (SR) are single component resins that begin curing upon exposure to moisture in the air, catalyzed by temperature.

The conformal moisture protection barrier 8 shown in FIG. 1b may further be a poly(para-xylylene) (XY) layer. The XY layer may for example be deposited using chemical vapour deposition (CVD) which is a vacuum process providing the highest penetration and coating thickness uniformity.

Although XY coatings are of particular interest due to the very high conformality of the CVD coating process and the bubble and pinhole free nature of the finished coating, the other types of coating mentioned above provide lower cost alternatives.

All of the types of conformal moisture protection barriers 8 mentioned above provide the necessary environmental protection but do not provide the necessary controlled optical qualities to use in critical optical interfaces 6. The latter is not required as the conformal moisture protection barrier 8 is outside the optical path 12 between the PIC 2 and the optical fiber 4. Therefore, the conformal moisture protection barrier 8 does not need to have a refractive index that matches the refractive index of any one of the materials of the first 3 and the second 5 optical waveguides, respectively.

By applying a liquid-phase silicone index match and protect material 7 and a conformal moisture protection coating 8, which no longer needs repeatable optical properties, the optical subassembly 1 according to the invention is provided with a near-hermetic environmental protection barrier 7, 8 that prevents contamination of any kind, i.e. particulate contamination and environmental moisture, in the optical interface 6.

Based on the above, it can be concluded that the near-hermetic protection barrier 7, 8 enables separation of critical optical quality requirements and critical protection quality requirements over a dual coating stack comprising the third 7 and fourth 8 materials discussed above instead of a single material.

FIG. 2 shows a schematic layout of an exemplary embodiment of an optical system 14 comprising an optical subassembly 1 according to the invention. The skilled person will appreciate that many optical systems 14 according to the invention ranging from low-complexity to high-complexity systems may be envisaged. Furthermore, the skilled person will appreciate that optical systems 14 according to the invention may be used in various applications including telecommunications applications.

Accordingly, it has been described that this invention relates to an optical subassembly 1 comprising a photonic integrated circuit 2, an external optical system 4 and an optical interface 6 that is arranged between the PIC 2 and the external optical system 4. The optical subassembly 1 comprises a third material 7, e.g. a silicone, and a fourth material 8 comprising a conformal moisture protection barrier that comprises at least one of an acrylic resin (AR), an epoxy resin (ER), a polyurethane resin (UR), a silicone resin (SR), and a poly(para-xylylene) (XY) layer. The third material 7 at least partially fills the optical interface 6 between the PIC 2 and the external optical system 4 in order to minimize contamination of any kind. The fourth material 8 is at least in contact with the third material 7 for sealing at least the third material 7 from ambient moisture.

In this way a low-cost packaging solution for optical subassemblies 1 may be provided that enables a near-hermetic environmental protection barrier 7, 8 and mechanical protection for the PIC 2 and associated optical 6 and electrical 13 interfaces of an optical subassembly 1. In addition, the near-hermetic environmental protection barrier 7, 8 may be arranged to support multiple optical interfaces 6 between the PIC 2 and optical fibers 4 or an external optical system.

The invention also relates to an optical system 14 comprising an optical subassembly 1 according to the invention.

Furthermore, the invention relates to a method of fabricating an optical subassembly 1 according to the invention. The method according to the invention does not require the tooling costs and lead time normally associated with conventional hermetic packaging. In addition, the method according to the invention may enable lower manufacturing costs due to a reduced number of piece parts and simplified processes attributable to using the combined silicone 7 and conformal coating 8 in order to provide the near-hermetic environmental protection barrier 7, 8.

In the foregoing description of the drawings, the invention has been described with reference to specific embodiments thereof. It will, however, be evident that various modifications/additions and/or changes/substitutions may be made thereto without departing from the scope of the invention as summarized in the attached claims.

In particular, combinations of specific features of various aspects of the invention may be made. An aspect of the invention may be further advantageously enhanced by adding a feature that was described in relation to another aspect of the invention.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

The invention claimed is:

1. An unpackaged near-hermetically protected optical subassembly (1) comprising:
   a photonic integrated circuit (2), PIC, having a first optical waveguide (3);
   an external optical system (4) having a second optical waveguide (5); and
   an optical interface (6) that is arranged between the PIC (2) and the external optical system (4) for optical communication between the first optical waveguide (3) and the second optical waveguide (5),
   a third material (7) at least partially filling said optical interface (6) while covering at least the first optical waveguide (3) and the second optical waveguide (5) for establishing a protected optical path (12) between the PIC (2) and the external optical system (4); and
   a fourth material (8) being in contact with at least the third material (7) for sealing at least said third material (7), wherein the fourth material (8) comprises a conformal moisture protection barrier that is arranged outside the protected optical path.

2. The optical subassembly (1) according to claim 1, wherein the third material (7) comprises a silicone.

3. The optical subassembly (1) according to claim 1, wherein the PIC (2) comprises a spot size converter (9), SSC, that is arranged between the first optical waveguide (3) and the second optical waveguide (5).

4. The optical subassembly (1) according to claim 1, wherein the conformal moisture protection barrier (8) comprises an acrylic resin, AR.

5. The optical subassembly (1) according to claim 1, wherein the conformal moisture protection barrier (8) comprises an epoxy resin, ER.

6. The optical subassembly (1) according to claim 1, wherein the conformal moisture protection barrier (8) comprises a polyurethane resin, UR.

7. The optical subassembly (1) according to claim 1, wherein the conformal moisture protection barrier (8) comprises a silicone resin, SR.

8. The optical subassembly (1) according to claim 1, wherein the conformal moisture protection barrier (8) comprises a vacuum deposited poly(para-xylylene), XY, layer.

9. An optical system (14) comprising an unpackaged near-hermetically protected optical subassembly (1) according to claim 1.

10. A method of fabricating an unpackaged near-hermetically protected optical subassembly (1) comprising:
    providing a photonic integrated circuit (2), PIC, having a first optical waveguide (3);
    providing an external optical system (4) having a second optical waveguide (5);
    arranging the PIC (2) and the external optical system (4) with respect to each other to establish an optical interface (6) for optical communication between the first optical waveguide (3) and the second optical waveguide (5);
    applying a third material (7) to at least partially fill said optical interface (6), said third material (7) at least covering the first optical waveguide (3) and the second optical waveguide (5) for establishing a protected optical path (12) between the PIC (2) and the external optical system (4); and
    applying a fourth material (8) to be in contact with at least the third material (7) for sealing at least said third material (7), said fourth material being a conformal moisture protection barrier that is arranged outside the protected optical path.

11. The method according to claim 10, wherein in the step of providing the third material, said third material (7) comprises a silicone.

12. The method according to claim 10, wherein said conformal moisture protection barrier (8) comprises an acrylic resin, AR, that is spin-coated and subsequently cured at elevated temperatures for forming a thin conformal film.

13. The method according to claim 10, wherein said conformal moisture protection barrier (8) comprises an epoxy resin, ER.

14. The method according to claim 10, wherein said conformal moisture protection barrier (8) comprises a polyurethane resin, UR.

15. The method according to claim 10, wherein said conformal moisture protection barrier (8) comprises a silicone resin, SR.

16. The method according to claim 10, wherein said conformal moisture protection barrier (8) comprises a poly(para-xylylene), XY, layer that is vacuum deposited using chemical vapour deposition, CVD.

17. An optical subassembly (1) comprising:
    a photonic integrated circuit (2), PIC, having a first optical waveguide (3);
    an external optical system (4) having a second optical waveguide (5); and
    an optical interface (6) arranged between the PIC (2) and the external optical system (4) for optical communication between the first optical waveguide (3) and the second optical waveguide (5);
    a liquid-phase silicone (7) at least partially filling said optical interface (6) while covering at least the first optical waveguide (3) and the second optical waveguide (5) for establishing a protected optical path (12) between the PIC (2) and the external optical system (4); and
    a conformal moisture protection barrier (8) in contact with at least the liquid-phase silicone (7) for moisture sealing at least said liquid-phase silicone (7), the conformal moisture protection barrier being arranged outside the protected optical path,
    wherein the optical subassembly (1) is an unpackaged near-hermetically protected optical subassembly (1).

18. The optical subassembly (1) of claim 17, wherein the conformal moisture protection barrier is comprised of a resin.

19. The optical subassembly (1) of claim 17, wherein the conformal moisture protection barrier (8) comprises a poly(para-xylylene) layer.

* * * * *